United States Patent [19]

Kamoshita et al.

[11] Patent Number: 5,229,457
[45] Date of Patent: Jul. 20, 1993

[54] THERMOPLASTIC RESIN COMPOSITION

[75] Inventors: Ryuji Kamoshita; Hiroki Kashiwagi; Koji Takimoto; Takeshi Watanabe, all of Yokkaichi, Japan

[73] Assignee: Monsanto Kasei Company, Tokyo, Japan

[21] Appl. No.: 786,783

[22] Filed: Nov. 1, 1991

[30] Foreign Application Priority Data

Nov. 2, 1990 [JP] Japan .................................. 2-297902

[51] Int. Cl.$^5$ .................. C08L 69/00; C08L 31/02
[52] U.S. Cl. .................................. 525/71; 525/85; 525/308
[58] Field of Search ............................ 525/71, 85, 308

[56] References Cited

U.S. PATENT DOCUMENTS

| | | | |
|---|---|---|---|
| 4,129,608 | 12/1978 | Murayama et al. | 525/85 |
| 4,404,323 | 9/1983 | Van der Loos et al. | 525/85 |
| 4,433,102 | 2/1984 | Brandstetter et al. | 525/85 |
| 4,699,947 | 10/1987 | Kokudo | 525/85 |
| 4,748,205 | 5/1988 | Katto et al. | 525/85 |
| 4,753,988 | 6/1988 | Henton et al. | 525/85 |
| 4,762,886 | 8/1988 | Hirai et al. | 525/85 |
| 4,801,646 | 1/1989 | Henton | 525/85 |
| 4,871,802 | 10/1989 | Duyzings et al. | 525/85 |
| 5,047,473 | 9/1991 | Piejko et al. | 525/71 |
| 5,075,363 | 12/1991 | Tsuda et al. | 525/71 |

FOREIGN PATENT DOCUMENTS 2067205 7/1981 United Kingdom .
2142034 1/1985 United Kingdom .

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

A thermoplastic composition comprising copolymers which contain 45-75% by weight of a vinyl cyanide and 25-55% by weight of an aromatic vinyl compound is described. This composition provides high stress cracking resistance in the presence of HCFC-123 and HCFC-141b.

17 Claims, No Drawings

THERMOPLASTIC RESIN COMPOSITION

The present invention relates to a resin composition which is capable of forming an internal box of a refrigerator excellent in flon resistance. More specifically, the present invention relates to a resin composition which comprises, as an essential component, a graft copolymer prepared by graft polymerizing a vinyl cyanide compound and an aromatic vinyl compound in a certain specific monomer ratio to an acrylic rubber and which is capable of forming an internal box of a refrigerator having excellent flon resistance, particularly very high stress cracking resistance in the presence of HCFC-123 and/or HCFC-141b.

In the present invention, "an internal box of a refrigerator" includes the interior of a door of the refrigerator.

The housing of a recent refrigerator is constructed in a form of a thermal insulation housing by a method wherein a rigid polyurethane foam stock is injected, foamed and solidified in a space formed between an internal box and an external box when the two boxes are connected to form the housing (such method will be hereinafter referred to as an in-situ foaming method). Further, in the door of a refrigerator, a rigid polyurethane foam is filled by an in-situ foaming method to form a thermal insulator in the space formed between the inner and outer plates connected to form the door.

Heretofore, an ABS resin which is commonly used, has been mainly employed for the internal box of a refrigerator. Here, the ABS resin which is commonly used, means a graft copolymer obtained by polymerizing a monomer mixture comprising from 10 to 40% by weight of a vinyl cyanide compound and from 60 to 90% by weight of an aromatic vinyl compound, in the presence of a conjugated diene rubber, or a resin composition prepared by blending to such a graft copolymer a vinyl cyanide compound/vinyl aromatic compound copolymer having a vinyl cyanide compound content of from 10 to 40% by weight, wherein the content of the conjugated diene rubber component is from 10 to 20% by weight.

As the reasons why such an ABS resin has been employed for the internal box of a refrigerator, there may be mentioned a good balance of physical properties such as rigidity and impact resistance, easy vacuum formability, excellent glossy appearance and stress cracking resistance against a flon such as CFC-11 (trichloromonofluoromethane) which is a foaming agent for a rigid polyurethane foam.

Namely, the internal box of a refrigerator is prepared by a so-called vacuum forming technique wherein a sheet of a thermoplastic resin is softened under heating and shaped against a mold under an air pressure of from 1 to 4 kg/cm$^2$. Therefore, the resin for the internal box is required to have easy vacuum formability, specifically a nature to maintain a proper viscoelasticity over a wide temperature range. Further, since the average thickness of the internal box prepared by such vacuum forming is less than 1 mm, the resin for the internal box is required to have both high rigidity and impact resistance in order to avoid a deformation or cracking due to the force when it is assembled to the external box.

When the rigid polyurethane foam is filled by an in-situ foaming method in the space formed by connecting an external box made of a steel sheet to the internal box made of the ABS resin, the rigid polyurethane foam adheres to the ABS resin and the steel sheet, whereby a stress will form due to the difference in the linear expansion coefficient among the steel sheet, the rigid polyurethane foam and the ABS resin and due to the temperature difference during the operation of the refrigerator. Accordingly, the resin for the internal box is required to have stress cracking resistance against CFC-11 which is a foaming agent for the rigid polyurethane foam. Further, a skin of the rigid polyurethane foam which is hard and brittle at a low temperature, forms at the surface of the internal box to create notch effects. Therefore, the resin for the internal box is required to have high Izod impact resistance at low temperatures.

Further, excellent gloss is required to improve the appearance of the refrigerator.

CFC-11 as a foaming agent for the rigid polyurethane foam, contains chlorine and is hardly decomposable. Thus, it is suspected that CFC-11 destroys the ozone stratum in the stratosphere, and there is a worldwide move to reduce and stop its use. It has been proposed to use HCFC-123 (1,1-dichloro-2,2,2-trifluoroethane) and/or HCFC-141b (2,2-dichloro-2-fluoroethane), as a foaming agent for the rigid polyurethane foam, which can be substituted for CFC-11. However, each of them has a higher dissolving power than CFC-11 against the ABS resin. Accordingly, an internal box of a refrigerator made of an ABS resin having a rigid polyurethane foam filled by an in-situ foaming method by means of HCFC-123 and/or HCFC-141b, is susceptible to crazing or cracking under stress and thus is not useful in the refrigerator, one of durable goods. Under these circumstances, it is necessary to prepare the internal box of a refrigerator and the interior of a refrigerator door with a material which has stress cracking resistance against HCFC-123 and/or HCFC-141b and which, at the same time, has a good balance of physical properties such as rigidity and impact resistance, easy vacuum formability and an excellent appearance, like the conventional material.

The present inventors have conducted extensive researches. As a result, they have found that a resin composition containing, as an essential component, a graft copolymer prepared by graft polymerizing a vinyl cyanide compound and an aromatic vinyl compound in a certain specific monomer ratio to an acrylic rubber, has very high stress cracking resistance even in the presence of HCFC-123 and/or HCFC-141b and at the same time, has a good balance of physical properties, easy vacuum formability and an excellent appearance, and this resin composition is useful for an internal box of a refrigerator and for the interior of a refrigerator door, wherein HCFC-123 and/or HCFC-141b is used instead of CFC-11 as a foaming agent for the rigid polyurethane foam. The present invention has been accomplished on the basis of these discoveries.

Thus, the present invention provides a thermoplastic resin composition comprising the following components (A), (B) and (C) in the following amounts:

from 5 to 100% by weight of Component (A): a graft copolymer (A) obtained by polymerizing from 30 to 90 parts by weight of a monomer mixture consisting essentially of from 45 to 75% by weight of a vinyl cyanide compound and from 25 to 55% by weight of an aromatic vinyl compound, in the presence of from 10 to 70 parts by weight of an acrylic rubber obtained by emulsion polymerization of a monomer mixture comprising from 80 to 100% by weight of an alkyl acrylate monomer wherein the alkyl group has from 2 to 12 carbon atoms, from 0 to 18% by weight of a vinyl monomer copolymerizable with said alkyl acrylate and from 0 to 2% by weight of a polyfunctional vinyl monomer (provided that said monomer mixture is 100% by weight in total);

from 0 to 80% by weight of Component (B): a graft copolymer (B) obtained by polymerizing from 30 to 90 parts by weight of a monomer mixture consisting essentially of from 45 to 75% by weight of a vinyl cyanide compound and from 25 to 55% by weight of an aromatic vinyl compound, in the presence of from 10 to 70 parts by weight of a conjugated diene rubber; and from 0 to 85% by weight of Component (C): a copolymer (C) obtained by polymerizing a monomer mixture consisting essentially of from 45 to 75% by weight of a vinyl cyanide compound and from 25 to 55% by weight of an aromatic vinyl compound.

The thermoplastic resin composition of the present invention has high stress cracking resistance even in the presence of HCFC-123 and/or HCFC-141b and at the same time, has a good balance of physical properties, easy vacuum formability and an excellent appearance (see Examples given hereinafter).

Such characteristics are considered to be attributable to the use of an acrylic rubber as Component B, i.e. a rubber component for so-called ABS resin, and selective use of those having high nitrile contents for Components A and S in certain specific ratios. (However, it should be understood that the present invention is by no means restricted by such a theory.) (See Comparative Examples given hereinafter.)

Thus, an internal box of a refrigerator made of the thermoplastic resin composition of the present invention is free from the above mentioned problems derived from HCFC-123 or HCFC-141b which will be widely used under the restriction against a flon.

Now, the present invention will be described in detail with reference to the preferred embodiments.

The thermoplastic resin composition of the present invention comprises specific Components (A) to (C) in specific amounts.

Namely, the thermoplastic resin composition of the present invention comprises from 5 to 100% by weight of the graft copolymer (A), from 0 to 80% by weight of the graft copolymer (B) and from 0 to 85% by weight of the copolymer (C) (provided that the total amount of Components (A) to (C) is 100% by weight). Preferred ranges of Components (A) to (C) are from 15 to 70% by weight of Component (A), from 0 to 60% by weight of Component (B) and from 30 to 80% by weight of Component (C). If the amounts are outside these ranges, various properties desired for a resin composition for forming an internal box of a refrigerator excellent in flon resistance, tend to deteriorate.

Component (A)

The graft copolymer (A) constituting the resin composition of the present invention is produced by subjecting an acrylic rubber obtained by emulsion polymerization as described hereinafter, to graft polymerization. This graft copolymer (A) is a high nitrile resin based on an acrylonitrile-acrylic rubber-styrene copolymer (AAS resin), and it is a basic constituting element which imparts not only very high stress cracking resistance to HCFC-123 and/or HCFC-141b but also impact resistance, easy vacuum formability and excellent glossy appearance to the resin composition of the present invention.

The acrylic rubber useful for the preparation of the graft copolymer (A) in the present invention, is produced by emulsion polymerization of a monomer mixture (I) comprising from 80 to 100% by weight of an alkyl acrylate monomer wherein the alkyl group has from 2 to 12 carbon atoms, from 0 to 18% by weight of a vinyl monomer copolymerizable with the alkyl acrylate, and from 0 to 2% by weight of a polyfunctional vinyl monomer (provided that the monomer mixture is 100% by weight in total).

The alkyl acrylate monomer as a constituting component of this acrylic rubber, is an alkyl acrylate wherein the alkyl group has from 2 to 12 carbon atoms. Specific examples include alkyl acrylates such as ethyl acrylate, propyl acrylate, n-butyl acrylate, butyl acrylate, amyl acrylate, hexyl acrylate, octyl acrylate, 2-ethylhexyl acrylate, cyclohexyl acrylate and dodecyl acrylate. These alkyl acrylates may be used alone or in combination as a mixture of two or more of them.

The monomer mixture (I) to be used for the preparation of this acrylic rubber, must contain the above alkyl acrylate monomer in an amount within a range of from 80 to 100% by weight. If the content is less than 80% by weight, the modulus of elasticity of the acrylic rubber tends to be large, such being undesirable. The content of this alkyl acrylate monomer may be 100% by weight, since the above monomer mixture (I) may contain no other component.

The vinyl monomer copolymerizable with this alkyl alkylate, includes monofunctional vinyl monomers such as an aromatic vinyl monomer as described hereinafter, a vinylcyanide monomer as described hereinafter, acrylamide, methacrylamide, vinylidene chloride, an alkyl(about $C_1$–$C_6$) vinyl ether, an alkyl(about $C_1$–$C_6$) methacrylate and halogen-substituted compounds thereof. As is apparent from the exemplification of acrylate compounds, the "vinyl monomer" has the same meaning as an "ethylenically unsaturated monomer". These vinyl monomers may be used alone or in combination as a mixture of two or more of them.

The amount of this copolymerizable vinyl monomer in the monomer mixture (I) must be selected within a range of from 0 to 18% by weight. If the content of this copolymerizable vinyl monomer exceeds 18% by weight, the modulus of elasticity tends to be large, and various properties as the acrylic rubber tend to deteriorate.

Another group of vinyl monomers copolymerizable with the above alkyl acrylate are polyfunctional vinyl monomers.

In the present invention, the polyfunctional vinyl monomer means a vinyl monomer containing at least two vinyl groups per molecule of the monomer, to cross-link the acrylic rubber. Specific examples of this polyfunctional vinyl monomer include aromatic polyfunctional vinyl monomers such as divinylbenzene and divinyltoluene, methacrylates and acrylates of polyhydric alcohols, such as ethylene glycol dimethacrylate and trimethylolpropane triacrylate, diallyl maleate, diallyl fumarate, triallyl isocyanurate, diallyl phthalate, allyl methacrylate and allyl acrylate. These polyfunctional vinyl monomers may be used alone or in combination as a mixture of two or more of them.

The amount of this polyfunctional vinyl monomer in the monomer mixture (I) must be selected within a range of from 0 to 2% by weight, preferably from 0.1 to 2% by weight. If this polyfunctional vinyl monomer is less than 0.1% by weight, the resulting acrylic rubber is noncross linked and thus tends to undergo plastic deformation. On the other hand, if it exceeds 2% by weight, the swellability and the degree of grafting of the resulting acrylic rubber for the graft copolymer (A) tend to be inadequate, and various properties of the rubber tend to deteriorate.

The acrylic rubber in the present invention, can be produced by a conventional emulsion polymerization method using water as a medium by a proper combination of various conditions including the types, the amounts and the methods of addition of the emulsifier and the polymerization catalyst, the method of addition of each monomer, the polymerization temperature and the method for adjusting the rubber particles.

The average rubber particle size of the resulting acrylic rubber latex is preferably within a range of from 0.05 to 5 μm. Especially, to ensure that the graft copolymer prepared by graft polymerizing a vinyl cyanide compound and an aromatic vinyl compound in a specific monomer ratio as described hereinafter, has the best balance of physical properties, the average rubber particle size is preferably within a range of from 0.1 to 0.5 μm.

The graft copolymer (A) in the present invention can be produced by adding from 30 to 90 parts by weight, preferably from 40 to 70 parts by weight, of a monomer mixture (II) consisting essentially of from 45 to 75% by weight of a vinyl cyanide compound and from 25 to 55% by weight of an aromatic vinyl compound, to from 10 to 70 parts by weight, preferably from 30 to 60 parts by weight, of the above acrylic rubber obtained by emulsion polymerization, followed by graft polymerization.

When the graft polymerization is carried out, if the amount of the monomer mixture (II) added, is less than 30 parts by weight, it tends to be difficult to form by the graft polymerization an adequate amount of resin to cover the surface of rubber particles of the acrylic rubber latex, whereby the degree of grafting tends to be low, and consequently the impact resistance and the dispersibility of the graft copolymer will be low, such being undesirable. On the other hand, if the amount added exceeds 90 parts by weight, the degree of grafting will be saturated and constant, and consequently, the resin not graft polymerized increases to lower the concentration of the acrylic rubber in the resin, such being undesirable.

Specific examples of the vinyl cyanide compound as a component of the above monomer mixture (II), include acrylonitrile and methacrylonitrile. Particularly preferred is acrylonitrile. These vinyl cyanide compounds may be used alone or in combination as a mixture of two or more of them. On the other hand, specific examples of the aromatic vinyl compound include unsubstituted, nucleus-substituted and side chain-substituted styrenes, for example, styrene, α-alkylstyrenes such as α-methylstyrene, nucleus substituted alkylstyrenes such as p-methylstyrene and vinyl xylene, halo-substituted styrenes such as monochlorostyrene and dichlorostyrene, and vinyl naphthalene. Among them, styrene is preferred. These aromatic vinyl compounds may be used alone or in combination as a mixture of two or more of them.

The monomer mixture (II) is required to consist essentially of from 45 to 75% by weight of a vinyl cyanide compound and from 25 to 55% by weight of an aromatic vinyl compound. If the vinyl cyanide compound is less than 45% by weight, the stress cracking resistance in the presence of HCFC-123 and/or HCFC-141b tends to be insufficient. On the other hand, if the vinyl cyanide compound exceeds 75% by weight, the easy vacuum formability specific to the styrenic resin will be lost. Here, the expression that the monomer mixture (II) "consists essentially of" the vinyl cyanide compound and the aromatic compound, means that a small amount (preferably up to about 10 parts by weight per 100 parts by weight of the total amount of the two monomers) of a comonomer may be contained in addition to the two monomers. In such a case, specific examples of the comonomer may be found among those exemplified as monofunctional comonomers for the above acrylic rubber (needless to say, they are other than vinyl cyanide compounds and aromatic vinyl compounds). Typical examples are alkyl(about $C_1$–$C_6$) methacrylates.

The graft copolymer (A) in the present invention, is prepared usually by an emulsion polymerization method. With respect to the emulsifier, the initiator, the molecular weight controlling agent, etc., those commonly employed in the emulsion polymerization of acrylonitrile-rubber component-styrene copolymers, may be used in a proper combination.

Preferred graft polymerization is as follows. Namely, the acrylic rubber latex, the emulsifier, the initiator and water are charged in prescribed amounts to a polymerization reactor. The monomer mixture is divided into two portions i.e. from 90 to 98% by weight of a first step monomer (mixture) comprising from 46 to 83% by weight of the vinyl cyanide compound and from 17 to 54% by weight of the aromatic vinyl compound, and from 2 to 10% by weight of a second step monomer comprising the aromatic vinyl compound (the total of the first step monomer and the second step monomer is 100% by weight). The first step monomer and a predetermined amount of a molecular weight controlling agent are continuously added in a predetermined period of time under stirring under a nitrogen stream, to have graft copolymerization proceeded. After completion of the addition of the first step monomer mixture, the second step monomer comprising the aromatic vinyl compound is continuously added in a predetermined period of time to complete the graft copolymerization. Here, along the progress of the graft copolymerization, a predetermined amount of the initiator and a predetermined amount of water are continuously added in a predetermined period of time. It is preferred to employ such a polymerization method wherein the composition of the monomer mixture continuously added during the graft copolymerization is changed, so that the stability of the high nitrile resin latex during the polymerization and after the polymerization can be maintained under a good condition. Here, the time for adding the first step monomer mixture is preferably at least two hours so that the composition of the resulting graft copolymer is made uniform. The time for adding the second step monomer is preferably at least 20 minutes to effectively stabilize the high nitrile resin latex. The amounts of the emulsifier, the initiator and the molecular weight controlling agent and the temperature for carrying out the graft copolymerization are determined depending upon the composition, the particle size and the amount of the rubber, the composition of the monomer mixture used for the graft copolymerization and the desired levels of the degree of grafting and the molecular weight of the resulting graft copolymer. The resulting graft copolymer is coagulated, separated, washed with water, dehydrated and dried by conventional methods.

The degree of grafting of the graft copolymer (A) in the present invention is preferably from 0.30 to 0.50. Here, the degree of grafting is a value calculated by (G-R)/R wherein G is the content, based on the graft copolymer, of the solid content obtained by dissolving and dispersing the graft copolymer in acetonitrile, followed by solid-liquid separation by means of a centrifugal separator, and R is the rubber content of the graft copolymer. If the degree of grafting is less than 0.30, it tends to be difficult to obtain a good balance of physical properties such as the rigidity and the impact resistance. On the other hand, if the degree of grafting exceeds 0.50, the easy vacuum formability tends to be lost.

The molecular weight of the graft copolymer (A) in the present invention is preferably such that the specific viscosity of the acetonitrile-soluble portion is within a range of from 0.04 to 0.09. Here, the specific viscosity of the acetonitrile-soluble portion means a value obtained by dissolving 0.1 g of the acetonitrile-soluble portion of the graft copolymer in 100 ml of dimethylformamide and measuring the specific viscosity at 25° C. by means of a viscometer. If the specific viscosity is outside the range of from 0.04 to 0.09, the easy vacuum formability tends to be lost.

Component (B)

The graft copolymer (B) constituting the resin composition of the present invention, corresponds to the one having the acrylic rubber in the graft copolymer (A) substituted by a conjugated diene rubber. This graft copolymer (B) is a high nitrile resin based on an acrylonitrile-butadiene rubber-styrene copolymer (ABS resin) and serves to impart particularly high impact resistance, easy vacuum formability and excellent glossy appearance to the resin composition of the present invention.

The conjugated diene rubber to be used for the preparation of the graft copolymer (B) in the present invention, owes at least the majority of its rubber elasticity to the conjugated diene. The conjugated diene rubber means any one of a homopolymer of a conjugated diene, a copolymer of a conjugated diene and a random copolymer or block copolymer of a conjugated diene with other comonomer. Specifically, the conjugated diene rubber includes, for example, polybutadiene, polyisoprene, polychloroprene, a butadiene-styrene copolymer, and a butadiene-acrylonitrile copolymer. Among them, polybutadiene, a butadiene-styrene copolymer and a butadiene-acrylonitrile copolymer are preferred. These materials may be used in combination.

The conjugated diene rubber in the present invention can be prepared by a conventional emulsion polymerization method using water as a medium by a proper combination of various conditions such as the types, the amounts and the methods for addition of the emulsifier and the polymerization catalyst, the method of addition of each monomer, the polymerization temperature and the method of controlling rubber particles.

The average rubber particle size of the conjugated diene rubber in the formed latex, is preferably within a range of from 0.05 to 5 $\mu$m. Especially to ensure that the graft copolymer prepared by graft polymerizing a vinyl cyanide compound and an aromatic vinyl compound having a specific monomer ratio as will be described hereinafter, has the best balance of physical properties, the average rubber particle size is preferably within a range of from 0.1 to 0.5 $\mu$m. Further, the average rubber particle size of the acrylic rubber for the graft copolymer (A) and the average particle size of the conjugated diene rubber for the graft copolymer (B) may be the same or different.

The graft copolymer (B) in the present invention can be prepared by adding from 30 to 90 parts by weight, preferably from 40 to 70 parts by weight, of a monomer mixture (III) consisting essentially of from 45 to 75% by weight of a vinyl cyanide compound and from 25 to 55% by weight of an aromatic vinyl compound, to from 10 to 70 parts by weight, preferably from 30 to 60 parts by weight, of the above conjugated diene rubber prepared by emulsion polymerization, followed by graft polymerization.

The reason for restricting the amount of the monomer mixture (III) to be added for the graft polymerization to a range of from 30 to 90 parts by weight is the same as the reason for restricting the amount of the monomer mixture (II) used for the graft polymerization of the above graft copolymer (A).

The vinyl cyanide compound and the aromatic vinyl compound constituting the above monomer mixture (III) are the same as described above respectively as the components constituting the monomer mixture (II) to be used for the graft polymerization of the graft copolymer (A).

The monomer mixture (III) is required to consist essentially of from 45 to 75% by weight of a vinyl cyanide compound and from 25 to 55% by weight of an aromatic vinyl compound. Here, the term "consists essentially of" has the same meaning as described above with respect to the monomer mixture (II). If the vinyl cyanide compound is less than 45% by weight, the stress cracking resistance of the resin composition comprising the graft copolymer (A) and the graft copolymer (B), in the presence of HCFC-123 and/or HCFC-141b tends to be inadequate. On the other hand, if the vinyl cyanide compound exceeds 75% by weight, the easy vacuum formability specific to the styrenic resin tends to be lost from the above resin composition. The ratio of the vinyl cyanide compound to the aromatic vinyl compound in the monomer mixture (III) may be the same or different from the ratio in the monomer mixture (II) useful for the graft polymerization of the above graft copolymer (A). However, if it differs, the difference in the content of the vinyl cyanide compound between the two monomer mixtures is preferably within 10% by weight. If the difference exceeds 10% by weight, the uniformity of the resin composition comprising the graft copolymer (A) and the graft copolymer (B) tends to deteriorate, whereby the balance of physical properties tends to deteriorate.

The graft copolymer (B) in the present invention is prepared usually by an emulsion polymerization method. With respect to the emulsifier, the initiator, the molecular weight controlling agent, etc., those which are commonly employed in the emulsion polymerization for acrylonitrile-rubber component-styrene copolymers, can be employed in a proper combination.

As a preferred graft polymerization method, the same method as described above for the graft polymerization of the graft copolymer (A), may be mentioned. Namely, it is preferred to employ a polymerization method in which the composition of the monomer mixture to be continuously added during the graft copolymerization, is changed to maintain the stability of the high nitrile resin latex under a good condition during the polymerization and after the polymerization.

The amounts of the emulsifier, the initiator and the molecular weight controlling agent and the temperature for carrying out the graft copolymerization are determined depending on the composition, the particle size and the amount of the rubber, the composition of the monomer mixture to be used for the graft copolymerization and the desired values for the degree of grafting and the molecular weight of the resulting graft copolymer. The resulting graft copolymer will be coagulated, separated, washed with water, dehydrated and dried by methods common to the emulsion polymerization.

The degree of grafting of the graft copolymer (B) in the present invention is preferably from 0.30 to 0.50. Here, the degree of grafting is a numerical value obtained in the same method as described above for the preparation of the graft copolymer (A). If the degree of grafting is less than 0.30, it tends to be difficult to obtain a good balance of physical properties such as the rigidity and impact resistance. On the other hand, if the degree of grafting exceeds 0.50, the easy vacuum formability tends to be lost.

The molecular weight of the graft copolymer (B) in the present invention is preferably such that the specific viscosity of the acetonitrile-soluble portion is within a range of from 0.04 to 0.09. Here, the specific viscosity of the acetonitrile-soluble portion is a numerical value obtained in the same method as described above for the preparation of the graft copolymer (A). If the specific viscosity is outside the range of from 0.04 to 0.09, the easy vacuum formability tends to be lost.

Further, there is no particular restriction between the degree of grafting and the specific viscosity of the above graft copolymer (A) and the degree of grafting and the specific viscosity of the graft copolymer (B). Any combination may be acceptable so long as the respective copolymers are within the respective desired ranges.

Component (C)

The copolymer (C) constituting the resin composition of the present invention is a high nitrile resin based on an acrylonitrile-styrene copolymer (AS resin) and serves to impart a good balance of physical properties such as rigidity and impact resistance, easy vacuum formability and excellent glossy appearance to the resin composition of the present invention.

The copolymer (C) in the present invention can be prepared by polymerizing a monomer mixture (IV) consisting essentially of from 45 to 75% by weight of a vinyl cyanide compound and from 25 to 55% by weight of an aromatic vinyl compound by using a suspension polymerization method preferably among such methods as an emulsion polymerization method, a suspension polymerization method, a solution polymerization method and a block polymerization method.

The vinyl cyanide compound and the aromatic vinyl compound constituting the above monomer mixture (IV) ar the same as described above respectively as the components of the monomer mixture (II) for the graft polymerization of the graft copolymer (A). The monomer mixture (IV) is required to consist essentially of from to 75% by weight of the vinyl cyanide compound and from 25 to 55% by weight of the aromatic vinyl compound. The term "consists essentially of" has the same meaning as described above with respect to the monomer mixture (II). If the vinyl cyanide compound is less than 45% by weight, the stress cracking resistance of the resin composition comprising the graft copolymer (A) and the copolymer (C) in the presence of HCFC-123 and/or HCFC-141b tends to be inadequate. On the other hand, if the vinyl cyanide compound exceeds 75% by weight, the easy vacuum formability specific to a styrenic resin tends to be lost from the above resin composition. The ratio of the vinyl cyanide compound to the aromatic vinyl compound in the monomer mixture (IV) may be the same or different from the ratio in the monomer mixture (II) useful for the graft polymerization of the above graft copolymer (A). If it differs, the difference in the content of the vinyl cyanide compound between the two monomer mixtures is preferably within 10% by weight. If the difference exceeds 10% by weight, the uniformity of the resin composition comprising the graft copolymer (A) and the copolymer (C) tends to deteriorate, and the balance of physical properties tends to deteriorate.

The copolymer (C) in the present invention is usually prepared by a suspension polymerization method. With respect to the initiator, the molecular weight controlling agent, a suspension stabilizer, the suspension stability assisting agent, etc., those commonly employed in the suspension polymerization of acrylonitrile-styrene copolymers, may be employed in a proper combination.

The polymerization method may also be the one commonly employed for the suspension polymerization method. Namely, the monomer mixture, the molecular weight controlling agent, the suspension stabilizer, a suspension stability assisting agent and water are charged to a polymerization reactor in the predetermined amounts. While stirring under a nitrogen stream, an initiator is charged at a predetermined temperature to initiate the copolymerization. Then, monomers are continuously added so that the composition of the monomer mixture in the polymerization reactor becomes constant, and then the copolymerization is completed. Here, the composition of the monomer mixture to be charged, the amounts of the molecular weight controlling agent, the suspension stabilizer and the suspension stability assisting agent are determined depending upon the compositional ratio of the vinyl cyanide compound to the aromatic vinyl compound of the resulting copolymer, and the desired value for the molecular weight. The resulting copolymer of vinyl cyanide compound/aromatic vinyl compound is subjected to extraction of unreacted monomers, washing and drying by methods which are commonly employed in the suspension polymerization method.

The molecular weight of the copolymer (C) in the present invention is preferably such that the specific viscosity is within a range of from 0.04 to 0.09. Here, the specific viscosity means a value obtained by dissolving 0.1 g of the copolymer in 100 ml of dimethylformamide and measuring the specific viscosity at 25° C. by a viscometer. This has the same meaning as the specific viscosity of the acetonitrile-soluble portion as described above for the preparation of the graft copolymer (A). If the specific viscosity is outside the range of from 0.04 to 0.09, the easy vacuum moldability tends to be lost.

Further, there is no particular restriction between the specific viscosity of the above graft copolymer (A) and the specific viscosity of the copolymer (C). Any combination may be acceptable so long as the respective specific viscosities are within the respective desired ranges.

Composition and its formation

The resin composition of the present invention can be prepared by using the above described graft copolymer (A) as an essential component and optionally blending thereto the graft copolymer (B) and/or the copolymer (C), followed by mixing and kneading.

Here, in the resin composition of the present invention, the total amount of the acrylic rubber component derived from the graft copolymer (A) and the conjugated diene rubber component derived from the graft copolymer (B), is preferably within a range of from 10 to 20% by weight based on the entire resin composition. Namely, if the rubber content of the graft copolymer (A) or of the mixture of the graft copolymers (A) and (B) exceeds 20% by weight, the copolymer (C) may be blended to obtain a resin composition wherein the rubber content is within a range of from 10 to 20% by weight. If the rubber content of the resin composition is less than 10% by weight, impact resistance required for the resin for the internal box of a refrigerator tends to be inadequate. On the other hand, if the rubber content exceeds 20% by weight, the rigidity required for the resin for the internal box of a refrigerator tends to be inadequate.

In the resin composition of the present invention, the ratio of the acrylic rubber component derived from the graft copolymer (A) to the conjugated diene rubber component derived from the graft copolymer (B) is preferably within the following range by weight %:

$$\frac{\text{Acrylic rubber component}}{\text{Conjugated diene rubber component}} = \frac{20}{80} \text{ to } \frac{100}{0}$$

Namely, the most important feature of the resin composition of the present invention i.e. the high stress cracking resistance to HCFC-123 and/or HCFC-141b, is brought by the graft copolymer (A) comprising the acrylic rubber, and it is essential that the resin composition contains this graft copolymer (A) as an essential component. On the other hand, the graft copolymer (B) comprising the conjugated diene rubber is superior to the graft copolymer (A) comprising the acrylic rubber in the efficiency to obtain impact resistance, and it is preferred to incorporate this graft copolymer (B) within a range not to impair the high stress cracking resistance to HCFC-123 and/or HCFC-141b. Accordingly, the proportion of the acrylic rubber to the entire rubber components of the resin composition is preferably within a range of from 20 to 100% by weight.

A conventional mixing and kneading method may be employed for blending, mixing and kneading the graft copolymer (A), the graft copolymer (B) and the copolymer (C).

For example, one or more of these copolymer resins in the form of powder, beads or pellets may be mixed and kneaded by an extruder such as a single screw extruder or a twin screw extruder, or a kneader such as a Banbury mixer, a pressure kneader or a twin roll to obtain a resin composition. In some cases, a method may be employed in which one or more of these copolymer resins are mixed in a non-dried state e.g. in a state of emulsion, then precipitated, washed, dried and kneaded.

With respect to the sequence for the mixing and kneading, the three types of constituting resins may simultaneously be mixed and kneaded, or one or two of the constituting resins may firstly be mixed and kneaded, and a separately kneaded one or more resins may be added thereto, and the mixture is kneaded to obtain the desired resin composition.

To the resin composition of the present invention, various additives for resins, such as a lubricant, a releasing agent, a coloring agent, an ultraviolet absorber, a light resistant stabilizer, a heat resistant stabilizer, a filler, a flame retardant and an antiseptic agent may be added in a suitable combination in such amounts and types that do not impair the nature of the resin.

The resin composition of the present invention may be fabricated into an internal box of a refrigerator or an interior of a refrigerator door by a conventional method for the production of the internal box of a refrigerator. It is common to melt the resin composition and mold it in a flat sheet by means of an extruder equipped with a coat hanger dye and cooled and solidified by a roll. Then, the flat sheet is molded into an internal box of a refrigerator or an internal box of a refrigerator door by a vacuum (or pressure) molding machine.

The present invention will be described in further detail with reference to Reference Examples, Working Examples and Comparative Examples. However, it should be understood that the present invention is by no means restricted to such specific Examples.

In the following Examples, "parts" and "%" mean "parts by weight" and "% by weight", respectively, unless otherwise specified.

1) Preparation of the respective components, etc.

(A) Preparation of an acrylate rubber

Into a reactor, 120 parts of water, 1.0 part of sodium hydrogen carbonate and 2.0 parts of a fatty acid soap were charged, and the mixture was heated to 75° C. When the temperature reached 75° C., 0.135 part of potassium persulfate and 3.3 part of deionized water were added.

Five minutes after completion of the addition of the above additives, the following monomer mixture was added as a monomer mixture of the first step:

| butyl acrylate | 3.8 parts |
| acrylonitrile | 0.2 part |
| allyl methacrylate | 0.02 part. |

After completion of the addition, the following monomer mixture was immediately added as a monomer mixture of the second step over a period of 3 hours:

| butyl acrylate | 91.7 parts |
| acrylonitrile | 4.8 parts |
| allyl methacrylate | 0.48 part. |

Further, 1.0 part of a fatty acid soap was added upon expiration of 2 hours from the initiation of the addition of the monomer mixture of the first step, and 0.015 part of potassium persulfate and 0.3 part of deionized water were added upon expiration of 2 hours and 30 minutes.

After completion of the addition, the mixture was heated to 80° C., reacted for 1 hour and then cooled to terminate the reaction.

The acrylic rubber latex thereby obtained had an average rubber particle size of 0.1 $\mu$m and a solid content of 40%.

(A1) Preparation of a graft copolymer (A-1)

Into a reactor, 50 parts of the acrylic rubber latex of the above (A) having the particle size enlarged to 0.20 $\mu$m with acetic anhydride, as a solid content, and 110 parts of deionized water were charged, and the mixture was heated to 65° C. During the temperature rise, the following materials were added:

| | |
|---|---|
| sodium alkyldiphenylether disulfonate | 1.0 part |
| Sumilizer GM (2,2'-methylenebis(4-methyl-6-t-butylphenol)monoacrylate) | 0.05 part |
| allyl methacrylate | 0.25 part |

A solution in 13 parts of water of:

| | |
|---|---|
| sodium pyrophosphate | 0.5 part |
| glucose | 1.0 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| | |
|---|---|
| acrylonitrile | 25 parts |
| styrene | 21.7 parts |
| n-dodecylmercaptan | 0.15 parts |

Then, after completion of the addition of the monomer mixture of the first step, 3.3 parts of styrene was added immediately as a monomer of the second step over a period of one hour.

Further, upon expiration of 30 minutes from the initiation of the addition of the monomer mixture of the first step, 0.175 part of cumene hydroperoxide, 0.7 part of sodium alkyldiphenylether disulfonate and 14.3 part of deionized water were continuously added over a period of 4 hours.

After completion of the addition of the monomer mixture of the second step, the reaction was continued for 1 hour, and the mixture was cooled to terminate the reaction.

To the graft polymer latex thus obtained, 1 part of an aging preventive agent was added. Then, the mixture was added to an aqueous magnesium sulfate solution heated to 95° C. under stirring to solidify it. The solidified product was washed with water and dried to obtain a graft copolymer resin as a white powder.

(A2) Preparation of a graft copolymer (A-2)

Into a reactor, 50 parts of the acrylic rubber latex of the above (A) having the particle size enlarged to 0.15 μm with acetic anhydride, as a solid content, and 110 parts of deionized water were charged, and the mixture was heated to 65° C. During the temperature rise, the following materials were added:

| | |
|---|---|
| sodium alkyldiphenylether disulfonate | 1.0 part |
| Sumilizer GM | 0.05 part |
| allyl methacrylate | 0.25 part |

A solution in 13 parts of water of:

| | |
|---|---|
| sodium pyrophosphate | 0.5 part |
| glucose | 1.0 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| | |
|---|---|
| acrylonitrile | 30 parts |
| styrene | 16.7 parts |
| n-dodecylmercaptan | 0.1 part. |

After completion of the addition of the monomer mixture of the first step, 3.3 parts of styrene was immediately added as a monomer of the first step over a period of 1 hour.

Further, upon expiration of 30 minutes after the initiation of the addition of the monomer mixture of the first step, 0.175 part of cumene hydroxide, 0.7 part of sodium alkyldiphenylether disulfonate and 14.3 parts of deionized water were continuously added over a period of 4 hours.

After completion of the addition of the monomer of the second stage, the reaction was continued for further one hour, and then the reaction mixture was cooled to terminate the reaction.

To the graft polymer latex thus obtained, 1 part of an aging preventive agent was added, and then the mixture was added to an aqueous magnesium sulfate solution heated to 95° C. under stirring, solidified, washed with water and dried to obtain a graft copolymer resin as a white powder.

(A3) Preparation of a graft copolymer (A-3)

Into a reactor, 50 parts of the acrylic rubber latex of the above (A) having the particle size enlarged to 0.12 μm with acetic anhydride, as a solid component, and 110 parts of deionized water were charged, and the mixture was heated to 65° C. During the temperature rise, the following materials were added:

| | |
|---|---|
| sodium alkyldiphenylether disulfonate | 1.0 part |
| Sumilizer GM | 0.05 part |
| allyl methacrylate | 0.25 part |

A solution in 13 parts of water of:

| | |
|---|---|
| sodium pyrophosphate | 0.5 part |
| glucose | 1.0 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| | |
|---|---|
| acrylonitrile | 35 parts |
| styrene | 11.7 parts |
| n-dodecylmercaptan | 0.25 parts |

After completion of the addition of the monomer mixture of the first step, 3.3 parts of styrene was immediately added as a monomer of the first step over a period of 1 hour.

Further, upon expiration of 30 minutes after the initiation of the addition of the monomer mixture of the first step, 0.175 parts of cumene hydroperoxide, 0.7 part of sodium alkyldiphenylether disulfonate and 14.3 parts of deionized water were continuously added over a period of 4 hours.

After completion of the addition of the monomer of the second step, the reaction was further continued for 1 hour, and then the reaction mixture was cooled to complete the reaction.

To the graft polymer latex thus obtained, 1 part of an aging preventive agent was added, and the mixture was added to an aqueous magnesium sulfate solution heated to 95° C. under stirring to solidify it, and the solidified product was washed with water and dried to obtain a graft copolymer resin as a white powder.

(A4) Preparation of a graft copolymer (A-4)

Into a reactor, 50 parts of the acrylic rubber latex of the above (A) having the particle size enlarged to 0.15 μm with acetic anhydride, as a solid content, and 110 parts of deionized water were charged, and the mixture was heated to 65° C. During the temperature rise, the following materials were added;

| sodium alkyldiphenylether disulfonate | 1.0 part |
|---|---|
| Sumilizer GM | 0.05 part |
| allyl methacrylate | 0.25 part |

A solution in 13 parts of water of:

| sodium pyrophosphate | 0.5 part |
|---|---|
| glucose | 0.25 part |
| ferrous sulfate | 0.005 part. |

When the temperature reached 65°, 0.075 part of cumene hydroperoxide and 0.3 part of sodium alkyldiphenylether disulfonate were added. Fifteen minutes later, the following monomer mixture was added over a period of 4 hours:

| acrylonitrile | 12.5 parts |
|---|---|
| styrene | 37.5 parts |
| t-dodecylmercaptan | 0.25 part. |

Further, upon expiration of 30 minutes from the initiation of the addition of the monomer mixture, 0.175 part of cumene hydroperoxide, 0.7 part of sodium alkyldiphenylether disulfonate and 14.3 parts of deionized water were continuously added over a period of 3 hours and 30 minutes.

After completion of the addition of the monomer, the reaction was continued for further 1 hour, and then the reaction mixture was cooled to terminate the reaction.

To the graft polymer latex thus obtained, 1 part of an aging preventive agent was added, and the mixture was added to a magnesium sulfate aqueous solution heated to 95° C. under stirring to solidify it, and the solidified product was washed with water and dried to obtain a graft copolymer resin as white powder.

(B) Preparation of a conjugated diene rubber

| 1.3-butadiene | 90 parts by weight |
|---|---|
| styrene | 10 parts by weight |
| fatty acid soap | 4 parts by weight |
| potassium persulfate | 0.15 part by weight |
| t-dodecylmercaptan | 0.3 part by weight |
| deionized water | 155 parts by weight |

A mixture of the above components was charged into a stainless steel reactor and reacted at 68° C. for 6 hours under stirring under a nitrogen atmosphere. Then, the temperature was raised from 68° C. to 80° C. over a period of 1.5 hours, and the reaction was further continued at 80° C. for 2.5 hours. Then, the reaction mixture was cooled to terminate the reaction.

The latex thereby obtained had a solid content concentration of 39.9%.

(B1) Preparation of a graft copolymer (B-1)

The styrene-butadiene rubber latex of the above (B) having a particle size of 0.1 μm was enlarged to a particle size of 0.20 μm with acetic anhydride. Into a reactor, 50 parts, as solid content, of the latex having the particle size enlarged and 110 parts of deionized water were charged, and the mixture was heated to 65° C. During the temperature rise, the following materials were added:

| sodium alkyldiphenylether disulfonate | 1.0 parts |
|---|---|
| Sumilizer GM | 0.05 part. |

A solution in 13 parts of water of:

| sodium pyrophosphate | 0.5 part |
|---|---|
| glucose | 0.6 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| acrylonitrile | 25 parts |
|---|---|
| styrene | 21.7 parts |
| n-dodecylmercaptan | 0.6 part. |

After completion of the addition of the monomer mixture of the first step, 3.3 parts of styrene was immediately added as a monomer of the second step over a period of 1 hour.

Further, upon expiration of 30 minutes from the initiation of the addition of the monomer mixture of the first step, 0.175 part of cumene hydroperoxide, 0.7 part of sodium alkyldiphenylether disulfonate and 14.3 parts of deionized water were continuously added over a period of 4 hours.

After completion of the addition of the monomer of the second step, the reaction was continued for further 1 hour, and then the reaction mixture was cooled to terminate the reaction.

To the graft polymer latex thereby obtained, one part of an aging preventive agent was added, and the mixture was added under stirring to an aqueous magnesium sulfate solution heated to 95° C. for solidification, and the solidified product was washed with water and dried to obtain a graft copolymer resin as a white powder.

(B2) Preparation of graft copolymer (B-2)

The styrene-butadiene rubber latex of the above (B) having a particle size of 0.1 μm was enlarged to a size of 0.14 μm with acetic anhydride. To the reactor, 50 parts, as solid content, of the latex having the particle size enlarged and 110 parts of deionized water were charged, and the mixture was heated to 65° C. During the temperature rise, the following materials were added.

| sodium alkyldiphenylether disulfonate | 1.0 part |
|---|---|
| Sumilizer GM | 0.05 part. |

A solution in 13 parts of water of:

| sodium pyrophosphate | 0.5 part |
|---|---|
| glucose | 0.75 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| acrylonitrile | 30 parts |
|---|---|
| styrene | 16.7 parts |
| n-dodecylmercaptan | 1.75 parts |

After completion of the addition of the monomer mixture of the first step, 3.3 parts of styrene was immediately added as a monomer of the second step over a period of 1 hour.

Further, upon expiration of 30 minutes from the initiation of the addition of the monomer mixture of the first step, 0.175 part of cumene hydroperoxide, 0.7 part of sodium alkyldiphenylether disulfonate and 14.3 parts of deionized water were continuously added over a period of 4 hours.

After completion of the addition of the monomer of the second step, the reaction was continued for further 1 hour, and then the reaction mixture was cooled to terminate the reaction.

To the graft polymer latex thereby obtained, 1 part of an aging preventive agent was added, and the mixture was added under stirring to an aqueous magnesium sulfate solution heated to 95° C. for solidification, and the solidified product was washed with water and dried to obtain a graft copolymer resin as a white powder.

(B3) Preparation of a graft copolymer (B-3)

The styrene-butadiene rubber latex of the above (B) having a particle size of 0.1 μm, was enlarged to a particle size of 0.12 μm with acetic anhydride. Into a reactor, 50 parts, as solid content, of the latex having the particle size enlarged and 110 parts of deionized water were charged, and the mixture was heated to 65° C. During the temperature rise, the following materials were added:

| sodium alkyldiphenylether disulfonate | 1.0 part |
|---|---|
| Sumilizer GM | 0.05 part. |

A solution in 13 parts of water of:

| sodium pyrophosphate | 0.5 part |
|---|---|
| glucose | 1.0 part |
| ferrous sulfate | 0.005 part. |

When the temperature reached 65° C., 0.075 part of cumene hydroperoxide and 0.3 part of sodium alkyldiphenylether disulfonate were added.

Fifteen minutes later, the following monomer mixture was added as a monomer mixture of the first step over a period of 4 hours:

| acrylonitrile | 35 parts |
|---|---|
| styrene | 11.7 parts |
| n-dodecylmercaptan | 1.75 parts |

After completion of the addition of the monomer mixture of the first step, 3.3 parts of styrene was immediately added as a monomer of the second step over a period of 1 hour.

Further, upon expiration of 30 minutes from the initiation of the addition of the monomer mixture of the first step, 0.175 part of cumene hydroperoxide, 0.7 part of sodium alkyldiphenylether disulfonate and 14.3 parts of deionized water were continuously added over a period of 4 hours.

After completion of the addition of the monomer of the second step, the reaction was continued for further one hour, and then, the reaction mixture was cooled to terminate the reaction.

To the graft polymer latex thereby obtained, 1 part of an aging preventive agent was added, and the mixture was added under stirring to an aqueous magnesium sulfate solution heated to 95° C. for solidification. The solidified product was washed with water and dried to obtain a graft copolymer resin as a white powder.

With respect to each of graft copolymers (A-1) to (A-4) and (B-1) to (B-3), the composition of the charge and the analytical values are shown in Table 1.

Here, the average rubber particle size is a weight average rubber particle size of a latex as measured by "Coulter Nano-Sizer" with respect to a system where the latex is dispersed in water of 23° C. Further, the degree of grafting and the specific viscosity of the acetonitrile-soluble portion were obtained by the respective procedures as described above in the detailed description of the process of the present invention.

TABLE 1

| | Graft copolymers | | | | | | |
|---|---|---|---|---|---|---|---|
| | A-1 | A-2 | A-3 | A-4 | B-1 | B-2 | B-3 |
| Type of rubber | acrylic type | acrylic type | acrylic type | acrylic type | conjugated diene type | conjugated diene type | conjugated diene type |
| Proportion of the monomer mixture in the graft copolymer | 50 wt % | 50 wt % | 50 wt % | 50 wt % | 50% wt % | 50% wt % | 50% wt % |
| Proportion of the vinyl cyanide compound in the monomer mixture | 50 wt % | 60 wt % | 70 wt % | 25 wt % | 50% wt % | 60% wt % | 70% wt % |
| Average rubber particle size | 0.20 μm | 0.15 μm | 0.12 μm | 0.15 μm | 0.20 μm | 0.14 μm | 0.12 μm |
| Degree of grafting | 0.43 | 0.45 | 0.38 | 0.41 | 0.40 | 0.40 | 0.42 |
| Specific viscosity of the acetonitrile-soluble portion | 0.061 | 0.065 | 0.060 | 0.057 | 0.075 | 0.068 | 0.051 |

(C1) Preparation of a vinyl cyanide compound/aromatic vinyl compound copolymer (C-1)

| | |
|---|---|
| acrylonitrile | 50 parts |
| styrene | 8 parts |
| terpene oil | 0.50 part |
| di-t-butyl p-cresol | 0.04 part |
| deionized water | 90 parts |
| acrylic acid-octyl acrylate copolymer | 0.03 part |
| sodium chloride | 0.18 part |

A mixture of the above components was charged into a stainless steel reactor and heated to 105° C. under stirring under a nitrogen atmosphere. Then, 0.15 part by weight of di-t-butylazo-1-cyano-cyclohexane dissolved in a small amount of styrene was added under nitrogen pressure to initiate the polymerization reaction. Immediately thereafter, 42 parts of styrene was continuously added to the reaction system over a period of 4 hours. During this period, the reaction temperature rose from 105° C. at the initiation of the polymerization to 141° C. After completion of the continuous addition of styrene to the reaction system, the temperature was raised to 145° C. over a period of 20 minutes, and stripping was further conducted at this temperature for 2.5 hours. Then, cooling of the reaction system and separation, washing and drying of the polymer were conducted by conventional methods to obtain a copolymer in the form of beads.

(C2) Preparation of a vinyl cyanide compound/aromatic vinyl compound copolymer (C-2)

| | |
|---|---|
| acrylonitrile | 60 parts |
| styrene | 5 parts |
| terpene oil | 0.52 part |
| di-t-butyl p-cresol | 0.04 part |
| deionized water | 90 parts |
| acrylic acid-octyl acrylate copolymer | 0.03 part |
| sodium chloride | 0.18 part |

A mixture of the above components was charged into a stainless steel reactor and heated to 105° C. under stirring under a nitrogen atmosphere. Then, 0.15 part by weight of di-t-butylazo-1-cyano-cyclohexane dissolved in a small amount of styrene, was added under pressure of nitrogen to initiate the polymerization reaction. Immediately thereafter, 35 parts by weight of styrene was continuously added to the reaction system over a period of 4 hours. During this period, the reaction temperature rose from 105° C. at the initiation of the polymerization to 141° C. After completion of the continuous addition of styrene to the reaction system, the temperature was raised to 145° C. over a period of 20 minutes, and stripping was further conducted at this temperature for 2.5 hours. Then, cooling of the reaction system and separation, washing and drying of the polymer were conducted in accordance with conventional methods to obtain a copolymer in the form of beads.

(C3) Preparation of a vinyl cyanide compound/aromatic vinyl compound copolymer (C-3)

| | |
|---|---|
| acrylonitrile | 70 parts |
| styrene | 3 parts |
| terpene oil | 0.60 part |
| di-t-butyl p-cresol | 0.02 part |
| deionized water | 70 parts |
| acrylic acid-octyl acrylate copolymer | 0.03 part |
| sodium chloride | 0.18 part |

A mixture of the above components was charged into a stainless steel reactor and heated to 105° C. under stirring under a nitrogen atmosphere. Then, 0.15 part by weight of di-t-butylazo-1-cyano-cyclohexane dissolved in a small amount of styrene, was added under a nitrogen pressure to initiate the polymerization reaction. Immediately thereafter, 27 parts by weight of styrene was continuously added to the reaction system over a period of 4 hours. During this period, the reaction temperature rose from 105° C. at the initiation of the polymerization to 141° C. After completion of the continuous addition of styrene to the reaction system, the temperature was raised to 145° C. over a period of 20 minutes. Further, stripping was conducted at this temperature for 2.5 hours. Then, cooling of the reaction system and separation, washing and drying of a polymer were conducted in accordance with conventional methods to obtain a copolymer in the form of beads.

(C4) Preparation of a vinyl cyanide compound/aromatic vinyl compound copolymer (C-4)

| | |
|---|---|
| acrylonitrile | 29 parts |
| styrene | 55 parts |
| terpene oil | 0.60 part |
| deionized water | 100 parts |
| acrylic acid-octyl acrylate copolymer | 0.02 part |
| sodium chloride | 0.14 part |

A mixture of the above components was charged into a stainless steel reactor and heated to 105° C. under stirring under a nitrogen atmosphere. Then, 0.04 part by weight of di-t-buty peroxide was added under a nitrogen pressure to initiate the polymerization reaction. Immediately thereafter, the reaction temperature was raised to 130° C. over a period of 25 minutes and maintained at that level for 30 minutes. Then, 16 parts by weight of styrene was continuously added to the reaction system over a period of 50 minutes, and the reaction temperature was raised to 148° C. Further, the reaction temperature was raised to 155° C. over a period of 20 minutes and maintained at that level for 30 minutes. Then, stripping was conducted at that temperature for 2 hours. Then, cooling of the reaction system and separation, washing and drying of the polymer were conducted in accordance with conventional methods to obtain a copolymer in the form of beads.

With respect to each of the vinyl cyanide compound-/aromatic vinyl compound copolymers (C-1) to (C-4), the composition of the charge and the analytical values are shown in Table 2.

Here, the specific viscosity was obtained in accordance with the procedure as described above in the detailed description of the process of the present invention.

TABLE 2

| | Vinyl cyanide/aromatic vinyl compound copolymers | | | |
|---|---|---|---|---|
| | C-1 | C-2 | C-3 | C-4 |
| Proportion of the vinyl cyanide compound in the copolymer | 50 wt % | 60 wt % | 70 wt % | 29 wt % |
| Specific viscosity | 0.070 | 0.068 | 0.059 | 0.065 |

2) Preparation of compositions

EXAMPLE 1

24 parts by weight of the graft copolymer (A-1) and 76 parts by weight of the copolymer (C-1) were melt-kneaded by a Banbury mixer to obtain a resin composition having a weight ratio of vinyl cyanide compound-/aromatic vinyl compound of 50/50 and an acrylic rubber content of 12% by weight.

EXAMPLE 2

30 parts by weight of the graft copolymer (A-1) and 70 parts by weight of the copolymer (C-1) were melt-kneaded by a Banbury mixer to obtain a resin composition having a weight ratio of vinyl cyanide compound-/aromatic vinyl compound of 50/50 and an acrylic rubber content of 15% by weight.

EXAMPLE 3

30 parts by weight of the graft copolymer (A-2) and 70 parts by weight of the copolymer (C-2) were melt-kneaded by a Banbury mixer to obtain a resin composition having a weight ratio of vinyl cyanide compound-/aromatic vinyl compound of 60/40 and an acrylic rubber content of 15% by weight.

EXAMPLE 4

36 parts by weight of the graft copolymer (A-2) and 64 parts by weight of the copolymer (C-2) were melt-kneaded by a Banbury mixer to obtain a resin composition having a weight ratio of vinyl cyanide compound-/aromatic vinyl compound of 60/40 and an acrylic rubber content of 18% by weight.

EXAMPLE 5

30 parts by weight of the graft copolymer (A-3) and 70 parts by weight of the copolymer (C-3) were melt-kneaded by a Banbury mixer to obtain a resin composition having a weight ratio of vinyl cyanide compound-/aromatic vinyl compound of 70/30 and an acrylic rubber content of 15% by weight.

EXAMPLE 6

20 parts by weight of the graft copolymer (A-1), 4 parts by weight of the graft copolymer (B-1) and 76 parts by weight of the copolymer (C-1) were melt-kneaded to obtain a resin composition having a weight ratio of vinyl cyanide compound/aromatic vinyl compound of 50/50, an acrylic rubber content of 10% by weight and a conjugated diene rubber content of 2% by weight.

EXAMPLE 7

16 parts by weight of the graft copolymer (A-1), 8 parts by weight of the graft copolymer (B-1) and 76 parts by weight of the copolymer (C-1) were melt-kneaded by a Banbury mixer to obtain a resin composition having a weight ratio of vinyl cyanide compound-/aromatic vinyl compound of 50/50, an acrylic rubber content of 8% by weight and a conjugated diene rubber content of 4% by weight.

EXAMPLE 8

20 parts by weight of the graft copolymer (A-2), 10 parts by weight of the graft copolymer (B-2) and 70 parts by weight of the copolymer (C-2) were melt-kneaded by a Banbury mixer to obtain a resin composition having a weight ratio of vinyl cyanide compound-/aromatic vinyl compound of 60/40, an acrylic rubber content of 10% by weight and a conjugated diene rubber content of 5% by weight.

EXAMPLE 9

10 parts by weight of the graft copolymer (A-2), 20 parts by weight of the graft copolymer (B-2) and 70 parts by weight of the copolymer (C-2) were melt-kneaded by a Banbury mixer to obtain a resin composition having a weight ratio of vinyl cyanide compound-/aromatic vinyl compound of 60/40, an acrylic rubber content of 5% by weight and a conjugated diene rubber content of 10% by weight.

EXAMPLE 10

20 parts by weight of the graft copolymer (A-3), 10 parts by weight of the graft copolymer (B-3) and 70 parts by weight of the copolymer (C-3) were melt-kneaded by a Banbury mixer to obtain a resin composition having a weight ratio of vinyl cyanide compound-/aromatic vinyl compound of 70/30, an acrylic rubber content of 10% by weight and a conjugated diene rubber content of 5% by weight.

COMPARATIVE EXAMPLE 1

30 parts by weight of the graft copolymer (A-4) and 70 parts by weight of the copolymer (C-4) were melt-kneaded by a Banbury mixer to obtain a resin composition having a weight ratio of vinyl cyanide compound-/aromatic vinyl compound of 25/75 and an acrylic rubber content of 10% by weight.

COMPARATIVE EXAMPLE 2

12 parts by weight of the graft copolymer (A-2) and 88 parts by weight of the copolymer (C-2) were melt-kneaded by a Banbury mixer to obtain a resin composition having a weight ratio of vinyl cyanide compound/aromatic vinyl compound of 60/40 and an acrylic rubber content of 6% by weight.

COMPARATIVE EXAMPLE 3

4 parts by weight of the graft copolymer (A-1), 20 parts by weight of the graft copolymer (B-1) and 76 parts by weight of the copolymer (C-1) were melt-kneaded by a Banbury mixer to obtain a resin composition having a weight ratio of vinyl cyanide compound/aromatic vinyl compound of 50/50, an acrylic rubber content of 2% by weight, and a conjugated diene rubber content of 10% by weight.

COMPARATIVE EXAMPLE 4

30 parts by weight of the graft copolymer (B-2) and 70 parts by weight of the copolymer (C-2) were melt-kneaded by a Banbury mixer to obtain a resin composition having a weight ratio of vinyl cyanide compound/aromatic vinyl compound of 60/40 and a conjugated diene rubber content of 15% by weight.

COMPARATIVE EXAMPLE 5

36 parts by weight of the graft copolymer (B-2) and 64 parts by weight of the copolymer (C-2) were melt-kneaded by a Banbury mixer to obtain a resin composition having a weight ratio of vinyl cyanide compound/aromatic vinyl compound of 60/40 and a conjugated diene rubber content of 18% by weight.

COMPARATIVE EXAMPLE 6

"Tufrex® YT-212" manufactured by Monsanto Kasei Company was prepared. This is an ABS resin widely used for internal boxes of refrigerators.

3) Measurements of physical properties

Suitability of the resin compositions of Examples 1 to 10 and Comparative Examples 1 to 6 for application to internal boxes of refrigerators, was evaluated with respect to the following seven items.

(1) Flexural modulus of elasticity

The flexural modulus of elasticity was measured in accordance with JIS K-7203. The flexural modulus of elasticity required to avoid a deformation of an internal box having an average thickness of less than 1 mm obtained by vacuum forming, is considered to be at least 22,000 kg/cm$^2$.

(2) Izod impact values (room temperature)

The Izod impact value was measured in accordance with JIS K-7110. The Izod impact value (at 23° C.) required to avoid cracking at the time of assembling an internal box to an external box, is considered to be at least 12 kg/cm$^2$.

(3) Izod impact values (low temperature)

The Izod impact value at −20° C. was measured. The Izod impact value (at −20° C.) required to be durable against notch effects of rigid polyurethane foam skin at a low temperature, is considered to be at least 6 kgcm/cm.

(4) Drop-weight impact value

A metal weight having a forward end radius of 0.25 inch was dropped on flat resin sheets of 75 mm×125mm×2.5 mm, whereupon the energy of the weight destroying 50% of the flat sheets was determined. The drop-weight impact value required to avoid cracking when an internal box is assembled with an external box is considered to be at least 200 kgcm.

(5) Vacuum forming by means of a model mold

Using a bucket-shaped model mold having an opening diameter of 300 mm, a depth of 250 mm and a bottom diameter of 200 mm, a resin sheet having a thickness of 2 mm was vacuum-formed by a plug assist reverse drawing method. The wall thickness distribution and the radius r of the bottom surface angle of the vacuum-formed product formed at the optimum heating temperature for the resin were measured. When the wall thickness distribution is uniform and the radius r of the bottom surface angle is small, the resin is considered to be excellent in vacuum formability.

(6) Critical strain value

A test piece in the form of a strip of 35 mm×230 mm×2 mm prepared by compression holding was set on a bending form (bending strain jig similar to ¼ elliptical jig having a maximum strain value of 0.7%). It was left to stand at a temperature of 23° C. under a CFC-11, HCFC-123 or HCFC-141b atmosphere. Upon expiration of 17 hours, the appearance of the test piece was visually observed and evaluated. A resin composition for an internal box durable against an in-situ foaming method is free from crazing or cracking and undergoes no swelling or dissolution.

(7) Low temperature strain value for generating whitening

A test piece was prepared such that a rigid polyurethane foam produced in accordance with the in-situ foaming method by means of CFC-11, HCFC-123 or HCFC-141b was bonded to a dumb-bell test piece of the resin composition formed by compression molding. The test piece was fixed on a jig in such a state that tensile strain was imparted to the test piece at 23° C., and cooled to −20° C., whereby the presence of absence of crazing or cracking upon expiration of 17 hours was visually determined.

The dumb-bell test piece had a larger width of 30 mm, a smaller width of 10 mm, a length of 115 cm and a thickness of 1 mm, and a polyurethane foam having a width of 10 mm, a thickness of 10 mm and a length of 50 mm was bonded to the smaller width portion.

The higher the value for generating whitening, the higher the stress cracking resistance against the foaming agent and the better as the resin composition for an internal box.

In Table 3, the compositions of the resin compositions of Examples 1 to 10 and Comparative Examples 1 to 6 and the results of evaluation are shown.

TABLE 3

| | Example 1 | Example 2 | Example 3 | Example 4 | Example 5 |
|---|---|---|---|---|---|
| Weight ratio of vinyl cyanide compound/aromatic vinyl compound | 50/50 | 50/50 | 60/40 | 60/40 | 70/30 |
| Total rubber content | 12 wt % | 15 wt % | 15 wt % | 18 wt % | 15 wt % |
| Weight ratio of acrylic rubber/conjugated diene rubber | 100/0 | 100/0 | 100/0 | 100/0 | 100/0 |
| Flexural modulus of elasticity | 29,500 kg/cm$^2$ | 26,500 kg/cm$^2$ | 27,000 kg/cm$^2$ | 24,000 kg/cm$^2$ | 27,000 kg/cm$^2$ |

TABLE 3-continued

|  |  |  |  |  |  |
|---|---|---|---|---|---|
| Izod impact value (room temp./low temp.) | 15/7 kgcm/cm | 20/9 kgcm/cm | 19/9 kgcm/cm | 24/12 kgcm/cm | 19/9 kgcm/cm |
| Drop-weight value | 250 kgcm | 295 kgcm | 305 kgcm | 350 kgcm | 290 kgcm |
| Vacuum forming by means of a model mold | ○ | ○ | ○ | ○ | ○ |
| Critical strain value |  |  |  |  |  |
| (CFC-11) | ○ | ○ | ○ | ○ | ○ |
| (HCFC-123) | ○ | ○ | ○ | ○ | ○ |
| (HCFC-141b) | ○ | ○ | ○ | ○ | ○ |
| Low temperature strain value for generating whitening |  |  |  |  |  |
| (CFC-11) | 1.6% | 1.7% | 1.7% | 1.8% | 1.7% |
| (HCFC-123) | 1.6% | 1.7% | 1.7% | 1.9% | 1.6% |
| (HCFC-141b) | 1.6% | 1.7% | 1.7% | 1.8% | 1.7% |

|  | Example 6 | Example 7 | Example 8 | Example 9 | Example 10 |
|---|---|---|---|---|---|
| Weight ratio of vinyl cyanide compound/aromatic vinyl compound | 50/50 | 50/50 | 60/40 | 60/40 | 70/30 |
| Total rubber content | 12 wt % | 12 wt % | 15 wt % | 15 wt % | 15 wt % |
| Weight ratio of acrylic rubber/conjugated diene rubber | 83/17 | 67/33 | 67/33 | 33/67 | 67/33 |
| Flexural modulus of elasticity | 29,500 kg/cm$^2$ | 29,500 kg/cm$^2$ | 27,000 kg/cm$^2$ | 27,000 kg/cm$^2$ | 27,500 kg/cm$^2$ |
| Izod impact value (room temp./low temp.) | 18/8 kgcm/cm | 20/8 kgcm/cm | 24/10 kgcm/cm | 27/11 kgcm/cm | 23/10 kgcm/cm |
| Drop-weight value | 245 kgcm | 250 kgcm | 290 kgcm | 290 kgcm | 295 kgcm |
| Vacuum forming by means of a model mold | ○ | ○ | ○ | ○ | ○ |
| Critical strain value |  |  |  |  |  |
| (CFC-11) | ○ | ○ | ○ | ○ | ○ |
| (HCFC-123) | ○ | ○ | ○ | ○ | ○ |
| (HCFC-141b) | ○ | ○ | ○ | ○ | ○ |
| Low temperature strain value for generating whitening |  |  |  |  |  |
| (CFC-11) | 1.3% | 1.2% | 1.5% | 1.3% | 1.6% |
| (HCFC-123) | 1.2% | 1.0% | 1.3% | 0.9% | 1.5% |
| (HCFC-141b) | 1.2% | 1.0% | 1.4% | 1.0% | 1.5% |

|  | Comparative Example 1 | Comparative Example 2 | Comparative Example 3 |
|---|---|---|---|
| Weight ratio of vinyl cyanide compound/aromatic vinyl compound | 25/75 | 60/40 | 50/50 |
| Total rubber content | 15 wt % | 6 wt % | 12 wt % |
| Weight ratio of acrylic rubber/conjugated diene rubber | 100/0 | 100/0 | 17/83 |
| Flexural modulus of elasticity | 25,000 kg/cm$^2$ | 35,000 kg/cm$^2$ | 30,000 kg/cm$^2$ |
| Izod impact value (room temp./low temp.) | 15/8 kgcm/cm | 8/4 kgcm/cm | 21/9 kgcm/cm |
| Drop-weight value | 300 kgcm | 180 kgcm | 240 kgcm |
| Vacuum forming by means of a model mold | ○ | ○ | ○ |
| Critical strain value |  |  |  |
| (CFC-11) | swelling | ○ | ○ |
| (HCFC-123) | swelling | ○ | ○ |
| (HCFC-141b) | swelling | ○ | ○ |
| Low temperature strain value for generating whitening |  |  |  |
| (CFC-11) | 1.5% | 1.1% | 1.1% |
| (HCFC-123) | 1.6% | 1.1% | 0.6% |
| (HCFC-141b) | 1.6% | 1.1% | 0.6% |

|  | Comparative Example 4 | Comparative Example 5 | Comparative Example 6 |
|---|---|---|---|
| Weight ratio of vinyl cyanide compound/aromatic vinyl compound | 60/40 | 60/40 | 25/75 |
| Total rubber content | 15 wt % | 18 wt % | 13 wt % |
| Weight ratio of acrylic rubber/conjugated diene rubber | 0/100 | 0/100 | 0/100 |
| Flexural modulus of elasticity | 27,000 kg/cm$^2$ | 24,000 kg/cm$^2$ | 25,000 kg/cm$^2$ |
| Izod impact value (room temp./low temp.) | 30/11 kgcm/cm | 35/12 kgcm/cm | 22/10 kgcm/cm |
| Drop-weight value | 300 kgcm | 340 kgcm | 380 kgcm |
| Vacuum forming by means of a model mold | ○ | ○ | ○ |
| Critical strain value |  |  |  |
| (CFC-11) | ○ | ○ | ○ |
| (HCFC-123) | ○ | ○ | swelling |
| (HCFC-141b) | ○ | ○ | swelling |
| Low temperature strain value for generating whitening |  |  |  |
| (CFC-11) | 1.1% | 1.2% | 0.6% |
| (HCFC-123) | 0.6% | 0.7% | 0.2% |

TABLE 3-continued

| (HCFC-141b) | 0.7% | 0.8% | 0.2% |

As is evident from the Examples and the Comparative Examples, the high stress cracking resistance against HCFC-123 and/or HCFC-141b as the main feature of the present invention, can be brought about by the weight ratio of the vinyl cyanide compound/aromatic vinyl compound and the weight ratio of the acrylic rubber/conjugated diene rubber of the resin composition.

Namely, with respect to the weight ratio of the vinyl cyanide compound/aromatic vinyl compound in the resin composition, when the vinyl cyanide compound is within a range of from 45 to 75% by weight, preferably within a range of from 50 to 70% by weight, no swelling will be observed against HCFC-123 or HCFC-141b in the measurement of the critical strain value, and the low temperature strain value for generating whitening will be higher than 0.6% which is the standard value shown by the combination of the current refrigerator (Comparative Example 6).

It is further surprising that with respect to the weight ratio of the acrylic rubber/conjugated diene rubber in the resin composition, when the acrylic rubber is within a range of from 20 to 100% by weight, the low temperature strain value for generating whitening will remarkably be high.

On the other hand, as is evident from the Examples and the Comparative Examples, a good balance of physical properties such as rigidity and impact resistance required for an internal box of a refrigerator and easy vacuum formability can be attained if the resin composition satisfies the above requirements and the total rubber content is within a range of from 10 to 20% by weight.

Accordingly, a resin composition having a weight ratio of the vinyl cyanide compound/aromatic vinyl compound within a range of from 45/55 to 75/25, a total rubber content of from 10 to 20% by weight and a weight ratio of the acrylic rubber/conjugated diene rubber within a range of from 20/80 to 100/0, is very useful for an internal box of a refrigerator wherein HCFC-123 and/or HCFC-141b is used as the main foaming agent for a rigid polyurethane foam.

We claim:

1. A thermoplastic resin composition comprising the following components (A), (B) and (C) in the following amounts:

from 10 to 20% by weight of Component (A): a graft copolymer (A) obtained by polymerizing from 30 to 90 parts by weight of a monomer mixture consisting essentially of from 45 to 75% by weight of a vinyl cyanide compound and from 25 to 55% by weight of an aromatic vinyl compound, in the presence of from 10 to 70 parts by weight of an acrylic rubber obtained by emulsion polymerization of a monomer mixture comprising from 80 to 100% by weight of an alkyl acrylate monomer wherein the alkyl group has from 2 to 12 carbon atoms, from 0 to 18% by weight of a vinyl monomer copolymerizable with said alkyl acrylate and from 0 to 2% by weight of a polyfunctional vinyl monomer provided that said monomer mixture is 100% by weight in total;

from 4 to 20% by weight of Component (B): a graft copolymer (B) obtained by polymerizing from 30 to 90 parts by weight of a monomer mixture consisting essentially of from 45 to 75% by weight of a vinyl cyanide compound and from 25 to 55% by weight of a vinyl compound, in the presence of from 10 to 70 parts of weight of a conjugated diene rubber; and from 70 to 85% by weight of Component (C): a copolymer (C) obtained by polymerizing a monomer mixture consisting essentially of from 45 to 75% by weight of a vinyl cyanide compound and from 25 to 55% by weight of an aromatic vinyl compound.

2. The thermoplastic resin composition according to claim 1, wherein the total amount of the acrylic rubber and the conjugated diene rubber is from 10 to 20% by weight, based on the entire resin composition, and the ratio by weight % of the acrylic rubber to the conjugated diene rubber is as follows:

$$\frac{\text{Acrylic rubber component}}{\text{Conjugated diene rubber component}} = \frac{33}{67} \text{ to } \frac{83}{17}.$$

3. The thermoplastic resin composition according to claim 1, wherein the alkyl acrylate monomer used in Component (A) is at least one member selected from the group consisting of ethyl acrylate, propyl acrylate, n-butyl acrylate, butyl acrylate, amyl acrylate, hexyl acrylate, octyl acrylate, 2-ethylhexyl acrylate, cyclohexyl acrylate and dodecyl acrylate; the vinyl monomer copolymerizable with said alkyl acrylate is at least one monofunctional vinyl monomer selected from the group consisting of an aromatic vinyl monomer, a vinyl cyanide monomer, acrylamide, methacrylamide, vinylidene chloride, an alkyl($C_1$–$C_6$) vinyl ether, an alkyl($C_1$–$C_6$) methacrylate and halogen-substituted compounds thereof; and the polyfunctional vinyl monomer is at least one member selected from the group consisting of divinylbenzene, divinyltoluene, ethylene glycol dimethacrylate, trimethylolpropane triacrylate, diallyl maleate, diallyl fumarate, triallyl isocyanurate, diallyl phthalate, allyl methacrylate and allyl acrylate.

4. The thermoplastic resin composition according to claim 1, wherein the acrylic rubber used in Component (A) has an average rubber particle size of from 0.05 to 5 μm, and the conjugated diene rubber used in Component (B) has an average rubber particle size of from 0.05 to 5 μm.

5. The thermoplastic resin composition according to claim 1, wherein the vinyl cyanide compound used in each of Components (A), (B) and (C) is acrylonitrile, methacrylonitrile or a mixture thereof.

6. The thermoplastic resin composition according to claim 1, wherein the aromatic vinyl compound used in each of Components (A), (B) and (C) is at least one member selected from the group consisting of unsubstituted styrene, a nucleus-substituted styrene, a side chain-substituted styrene, a halo-substituted styrene and vinyl naphthalene.

7. The thermoplastic resin composition according to claim 1, wherein the graft copolymer (A) has a degree of grafting of from 0.30 to 0.50 and a molecular weight such that the specific viscosity of the acetonitrile-soluble portion is within a range of from 0.04 to 0.09; the graft copolymer (B) has a degree of grafting of from 0.30 to 0.50 and a molecular weight such that the specific viscosity of the acetonitrile-soluble portion is within a range of from 0.04 to 0.09; and the copolymer (C) has a molecular weight such that the specific viscosity of the dimethylformamide-soluble portion is within a range of from 0.04 to 0.09.

8. The thermoplastic resin composition according to claim 1, wherein the conjugated diene rubber used in Component (B) is at least one member selected from the group consisting of polybutadiene, polyisoprene, polychloroprene, a butadiene-styrene copolymer and a butadiene-acrylonitrile copolymer.

9. A thermoplastic resin composition comprising the following components (A) and (C) in the following amounts:

from 20 to 40% by weight of Component (A): a graft copolymer (A) obtained by polymerizing from 30 to 90 parts by weight of a monomer mixture consisting essentially of from 45 to 75% by weight of a vinyl cyanide compound and from 25 to 55% by weight of an aromatic vinyl compound, in the presence of from 10 to 70 parts by weight of an acrylic rubber obtained by emulsion polymerization of a monomer mixture comprising from 80 to 100% by weight of an alkyl acrylate monomer wherein the alkyl group has from 2 to 12 carbon atoms, form 0 to 18% by weight of a vinyl monomer copolymerizable with said alkyl acrylate and from 0 to 2% by weight of a polyfunctional vinyl monomer provided that said monomer mixture is 100% by weight in total;

from 60 to 80% by weight of Component (C): a copolymer (C) obtained by a polymerizing a monomer mixture consisting essentially of from 45 to 75% by weight of a vinyl cyanide compound and from 25 to 55% by weight of an aromatic vinyl compound.

10. A thermoplastic resin composition as claimed in claim 9 comprising 24 to 36% by weight of Component (A) and 64 to 76% by weight of Component (C).

11. The thermoplastic resin composition according to claim 9, wherein the alkyl acrylate monomer used in Component (A) is at least one member selected from the group consisting of ethyl acrylate, propyl acrylate, n-butyl acrylate, butyl acrylate, amyl acrylate, hexyl acrylate, octyl acrylate, 2-ethylhexyl acrylate, cyclohexyl acrylate and dodecyl acrylate; the vinyl monomer copolymerizable with said alkyl acrylate is at least one monofunctional vinyl monomer selected from the group consisting of an aromatic vinyl monomer, a vinyl cyanide monomer, acrylamide, methacrylamide, vinylidene chloride, an alkyl($C_1$-$C_6$) vinyl ether, an alkyl($C_1$-$C_6$) methacrylate and halogen-substituted compounds thereof; and the polyfunctional vinyl monomer is at least one member selected from the group consisting of divinylbenzene, divinyltoluene, ethylene glycol dimethacrylate, trimethylolpropane triacrylate, diallyl maleate, diallyl fumarate, triallyl isocyanurate, diallyl phthalate, allyl methacrylate and allyl acrylate.

12. The thermoplastic resin composition according to claim 9, wherein the acrylic rubber used in Component (A) has an average rubber particle size of from 0.05 to 5 $\mu$m.

13. The thermoplastic resin composition according to claim 9, wherein the vinyl cyanide compound used in each of Components (A) and (C) is acrylonitrile, methacrylonitrile or a mixture thereof.

14. The thermoplastic resin composition according to claim 9, wherein the aromatic vinyl compound used in each of Component (A) and (C) is at least one member selected from the group consisting of unsubstituted styrene, a nucleus-substituted styrene, a side chain-substituted styrene, a halo-substituted styrene and vinyl naphthalene.

15. The thermoplastic resin composition according to claim 9, wherein the graft copolymer (A) has a degree of grafting of from 0.03 to 0.50 and a molecular weight such that the specific viscosity of the acetonitrile-soluble portion is within a range of from 0.04 to 0.09; and the copolymer (C) has a molecular weight such that the specific viscosity of the dimethylformamide-soluble portion is within a range of from 0.04 to 0.09.

16. The thermoplastic resin composition according to claim 1, wherein the total rubber content of the composition is from 12 to 15% by weight.

17. The thermoplastic resin composition according to claim 9, wherein the total rubber content of the composition is from 12 to 18% by weight.

* * * * *